United States Patent
Brinkley

(10) Patent No.: US 9,541,942 B2
(45) Date of Patent: Jan. 10, 2017

(54) AIRCRAFT ELECTRIC TAXI CONTROL INTERFACE AND SYSTEM

(71) Applicant: HONEYWELL INTERNATIONAL INC., Morristown, NJ (US)

(72) Inventor: Christian D. Brinkley, Plymouth, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 40 days.

(21) Appl. No.: 14/570,375

(22) Filed: Dec. 15, 2014

(65) Prior Publication Data

US 2016/0170435 A1    Jun. 16, 2016

(51) Int. Cl.
*H02K 7/14* (2006.01)
*G05G 1/04* (2006.01)
*B64C 25/40* (2006.01)

(52) U.S. Cl.
CPC .............. *G05G 1/04* (2013.01); *B64C 25/405* (2013.01)

(58) Field of Classification Search
CPC ....................................................... H01H 3/26
USPC .............................................. 318/3, 34, 558
See application file for complete search history.

(56) References Cited

U.S. PATENT DOCUMENTS

| | | | |
|---|---|---|---|
| 6,046,560 A * | 4/2000 | Lu | B62D 5/0463 180/443 |
| 6,947,742 B1 * | 9/2005 | Corrigan | G08G 5/0013 340/947 |
| 9,139,294 B2 * | 9/2015 | Bayer | B64C 25/50 |
| 2013/0193263 A1 | 8/2013 | Schweighart et al. | |

FOREIGN PATENT DOCUMENTS

CN    201780895 U    3/2011

* cited by examiner

*Primary Examiner* — David S Luo
(74) *Attorney, Agent, or Firm* — Shimokaji IP

(57) ABSTRACT

A control interface for an aircraft electric taxi system (ETS) may be incorporated in a housing positioned in a flight deck of the aircraft. The control interface may include an actuator, an electronic control sensor interconnected with the ETS to provide speed and direction signals to the ETS and an extendable shaft interposed between the actuator and the electronic control sensor. The actuator may be configured to rotate around an axis of the shaft between a first rotational position, in which the actuator is stowed within the housing, and a second rotational position in which the actuator is outside of the housing.

19 Claims, 9 Drawing Sheets

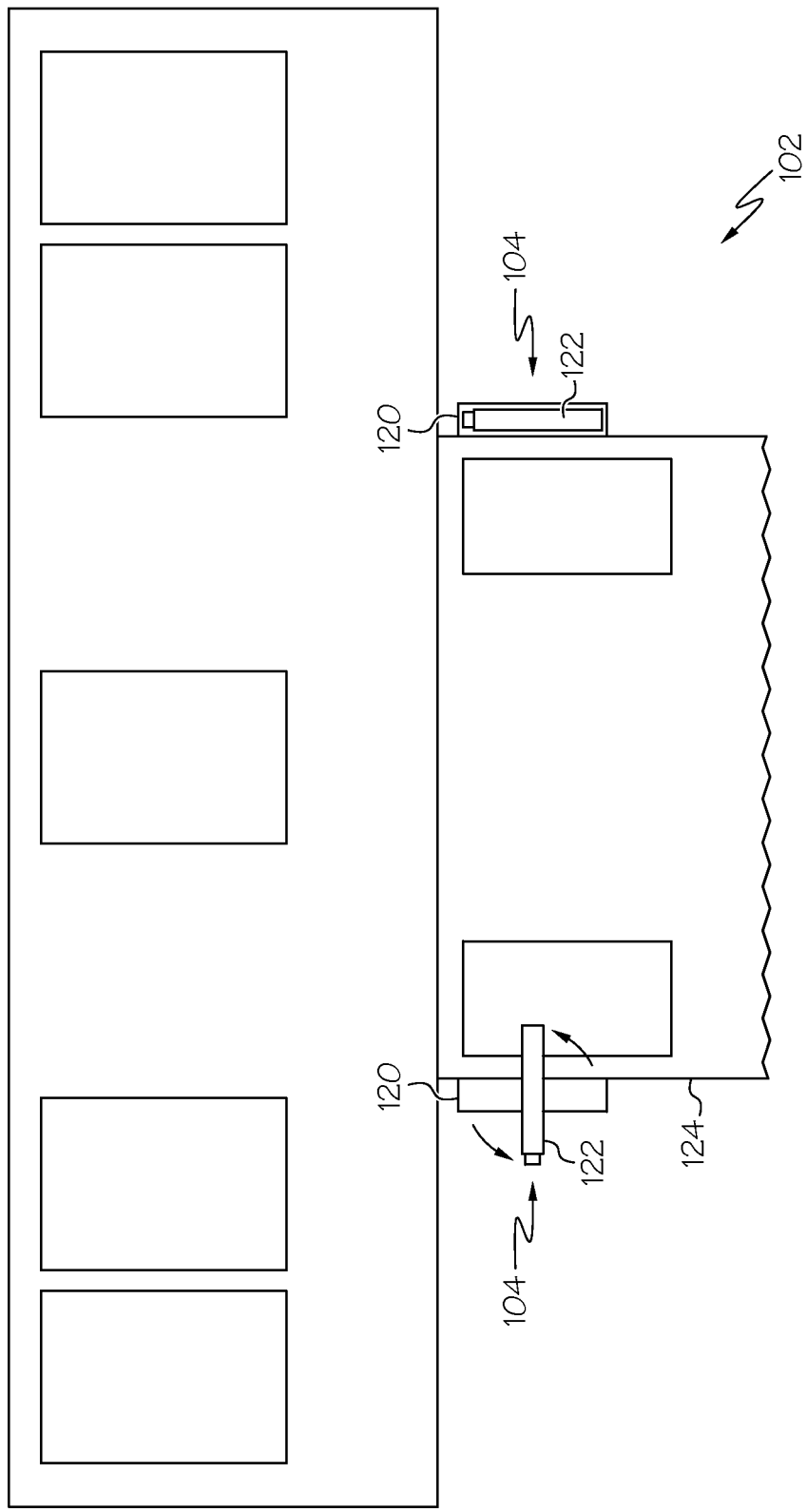

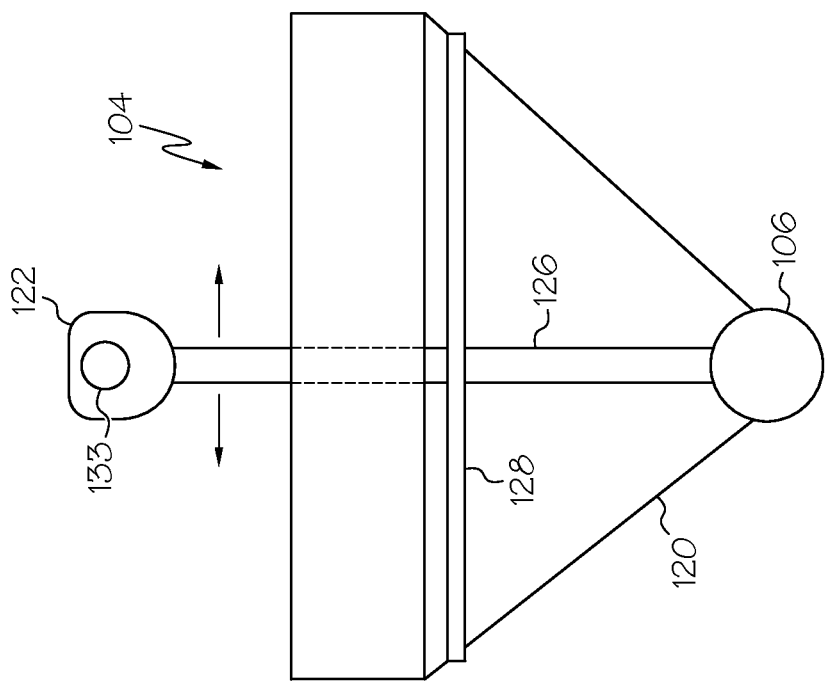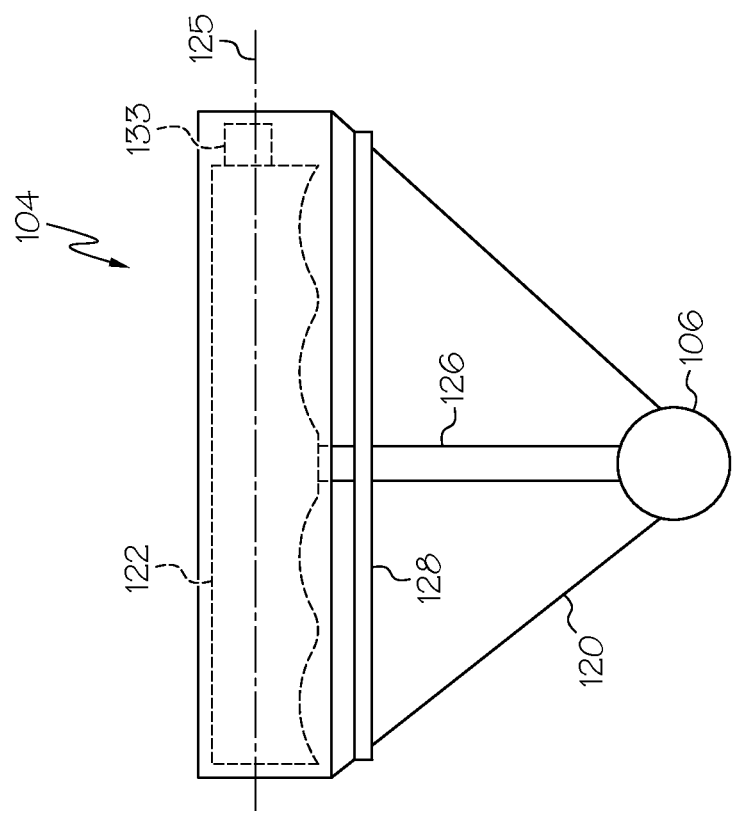

AIRCRAFT ELECTRIC TAXI CONTROL INTERFACE AND SYSTEM

BACKGROUND OF THE INVENTION

The present invention generally relates to a control interface for an electric taxi system (ETS) on an aircraft.

ETS systems on aircraft allow motive power for aircraft during taxi operations to be supplied by electric motors powered by an auxiliary power unit (APU) instead of through the aircraft main engines. This may lead to increased fuel efficiency. There is a need for intuitive pilot controls for ETS which will not interfere with other aircraft controls, Pilots may have to divide their attention during taxi operations between communications with an air traffic control tower, watching the runway through windows and cameras, and other tasks. Having an intuitive ETS control which allows the pilot to activate an ETS control interface, choose a desired speed, arm the ETS system, and/or take other actions without having to physically look at the ETS control may ease pilot fatigue, and allow the pilot to focus his/her visual attention on another task or control system. An ETS control which prevents inadvertent movement may also assist a pilot in performing all of the tasks inherent in taxi operations.

Many existing aircraft are not presently equipped with an ETS. A large number of such aircraft are employed on relatively short air routes. In this context, the short-route aircraft may experience a need for taxiing during a significant fraction of their respective engine running time. Consequently, these existing short-route aircraft could benefit from being retrofitted with an ETS.

As can be seen, there may be an ongoing need for an ETS control interface which is unobtrusive and/or intuitive. Moreover, there is a need for such a control interface that can be readily installed in an existing aircraft as part of an ETS retrofit.

SUMMARY OF THE INVENTION

In one aspect of the present invention, a control interface for an aircraft electric taxi system (ETS) may comprise: an actuator; an electronic control sensor that provides speed and direction signals to the ETS; and an extendable shaft interposed between the actuator and the electronic control sensor; wherein the actuator is configured to rotate around an axis of the shaft between a first rotational position in which the actuator is non-operational and a second rotational position in which the actuator is operational.

In another aspect of the present invention, a control interface assembly for use in an aircraft may comprise: a shaft assembly extendable between a first length and a second length longer than the first length; an actuator attached to an end of the shaft assembly; a locking device for maintaining the shaft assembly at its first length; a releasing device configured to disengage the locking device upon compression of the shaft assembly from the first length to a third length shorter than the first length so that the shaft assembly is free to expand to the second length.

In yet another aspect of the present invention, a method for controlling an aircraft electric taxi system (ETS) may comprise the steps of: releasing an actuator of a control interface by applying pilot-controlled pressure to the actuator; rotating the actuator to an active rotational position orthogonal to a stowed rotational position; and moving the actuator to produce a speed and direction signal to the ETS.

These and other features, aspects and advantages of the present invention will become better understood with reference to the following drawings, description and claims.

BRIEF DESCRIPTION OF THE DRAWINGS

FIG. 2 is a plan view of a flight deck of an aircraft with an ETS control interface according to an exemplary embodiment of the present invention;

FIG. 3 is a side view of the ETS control interface of FIG. 2 with an actuator in a stowed position according to an exemplary embodiment of the present invention;

FIG. 4 is a side view of the ETS control interface of FIG. 2 with an actuator in an active position according to an exemplary embodiment of the present invention;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The present invention generally provides a control interface for an ETS to provide motive power to an aircraft during taxi operations. The control interface may provide the pilot with an intuitive control for the ETS. Moreover, the control interface may be readily installed into existing aircraft during a retrofit installation of an ETS in the aircraft.

Figure 1:
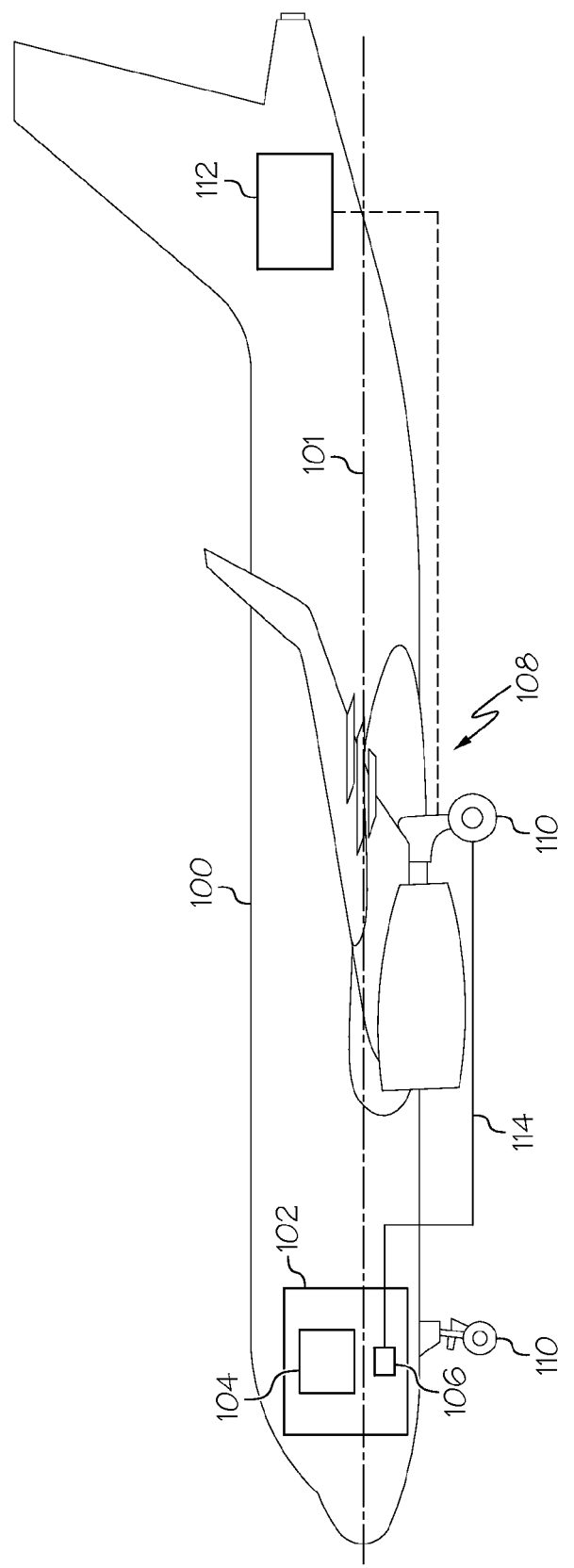
FIG. 1 is a schematic drawing of an aircraft with an ETS and an ETS control interface according to an exemplary embodiment of the present invention.

Referring now to FIG. 1, an exemplary aircraft 100 with an ETS 108 and ETS control interface 104 is illustrated in a schematic drawing. The aircraft may have a longitudinal axis 101. The aircraft 100 may include an auxiliary power unit (APU) 112, the ETS 108, a flight deck 102 having the electric taxi system control interface 104, and an electronic control sensor 106 configured to generate a desired speed and/or direction signal 114. The aircraft 100 may be equipped with one or more landing gear assemblies 110 which may be used for take-offs, landings, and taxi operations. Motive power to the aircraft 100 during travel on land may be provided by main engines or the ETS 108.

Referring now to FIG. 2, the exemplary flight deck 102 of the aircraft 100 with the ETS control interface 104 is illustrated. The flight deck 102 may include a cockpit or any space in the forward fuselage of the aircraft 100. The flight deck 102 may be enclosed and may include flying controls, instrument panels, and seats for the pilot, copilot, and/or other persons. The flight deck 102 may include the ETS control interface 104. The pilot, copilot, or another person may enter control commands to the ETS 108 through the ETS control interface 104. The control commands may include, for example, a desired direction command (i.e., forward or reverse) and a desired speed command. As shown in FIG. 1, the electronic control sensor 106 may generate the ETS control signal 114 in response to an input to the ETS control interface 104. The control signal 114 may include, for example, a desired speed and direction signal.

In an exemplary embodiment, the control interface 104 may include a housing 120 and an actuator, such as a handle, 122. The flight deck 102 may be provided with two control interfaces 104. One of the control interfaces 104 may be mounted on a port side of a center console 124 and the other one of the control interfaces may 104 be mounted on a starboard side of the center console 124. The actuators 122 of the control interfaces 104 may be stowed within their respective housings 120 whenever the ETS 108 is not operational. In an exemplary embodiment, the housing 120 may be relatively small, for example about 5 inches long and about 1 inch wide. Thus, the presence of the control interfaces 104 is only minimally obtrusive during in-flight aircraft operation.

Moreover, installation of the control interfaces 104 on sides of the center console 124 may be readily performed as part of an ETS retrofitting operation in an existing aircraft. Typically, side surfaces of center consoles are free from instrumentation or controls because these surfaces cannot be readily seen by a pilot or co-pilot from his or her normal seating position. However, as explained later, the control interfaces 104 may be activated and operated by employing intuitive manual steps. ETS speed and direction control may be accomplished without a need for direct visual observation of the control interface 104 by the pilot. Thus because, the control interfaces 104 may be installed on center console side surfaces, their installation may not require relocation of any pre-existing instrumentation or controls of the aircraft 100.

Figure 5:
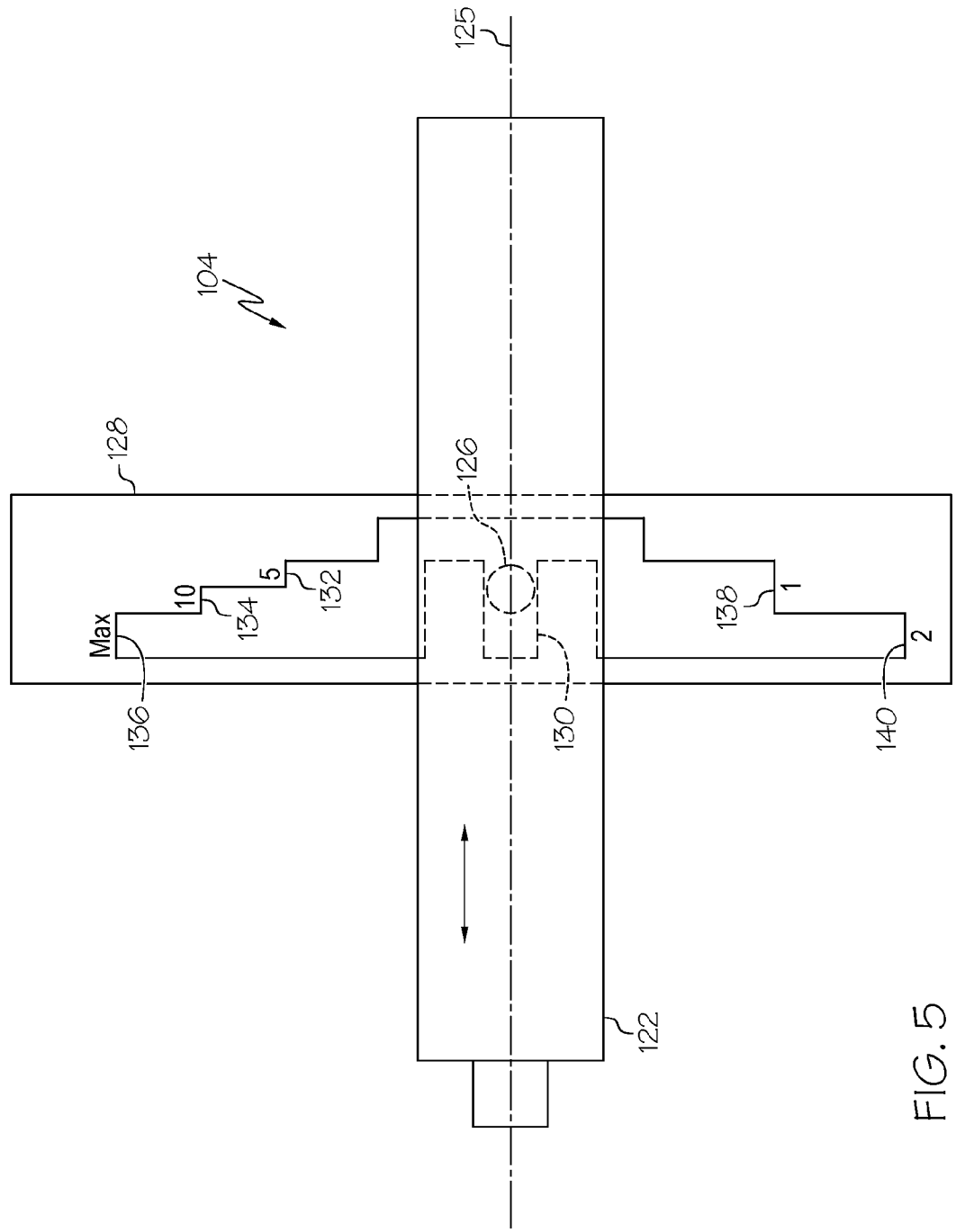
FIG. 5 is a top view of the ETS control interface of FIG. 2 in an active position according to an exemplary embodiment of the present invention.

Referring now to FIGS. 3, 4 and 5, operational features of an exemplary embodiment of the control interface 104 are shown. In FIG. 3, the actuator 122 is shown as being stowed in the housing 120. In FIG. 4, the actuator 122 is shown in an active mode in which the actuator 122 projects out of the housing 120. It may be seen by comparing FIGS. 3 and 4 that a longitudinal actuator axis 125 may be oriented in a first rotational position when the actuator 122 is stowed; and the actuator axis 125 may be oriented in a second rotational position, orthogonal to the first rotational position when the actuator 122 is in an active mode as shown in FIG. 4. The actuator 122 may be attached to an extendable shaft assembly 126. The shaft assembly 126 may be coupled to the electronic control sensor 106 of FIG. 1. In the exemplary embodiment of FIGS. 3 and 4 the sensor 106 may be a rotary encoder.

A restrictor plate 128 may be interposed between the actuator 122 and the sensor 106. Referring particularly to FIG. 5, it may be seen that the restrictor plate 128 is provided with a plurality of stops. In an exemplary embodiment, the restrictor plate 128 may have a neutral stop 130, a minimum forward speed stop 132, an intermediate forward speed stop 34, a maximum forward speed stop 136, a minimum reverse speed stop 138, and a maximum reverse speed stop 140. The shaft assembly 126 may be movable laterally. The actuator 122 may be spring-biased to be laterally self centering. In order to move the actuator 122 out of its neutral stop 130, the actuator 122 may be laterally displaced so that the shaft assembly 126 is free of the neutral stop 130. Then, with appropriate lateral actuator movements in combination with forward or reverse movements of the actuator, a pilot or co-pilot of the aircraft may select a particular operating speed and direction of taxiing of the aircraft. It may be noted that, because the shaft assembly 126 may be self centering, movement of the actuator 122 from forward direction speed stops to reverse direction speed stops may result in the shaft assembly 126 being captured in the neutral stop 130 thus reducing risk of inadvertent taxiing direction change.

ETS speed and direction choices may be made by "feel". In other words, there may be no need for potentially distracting visual observation of the control interface 104 during speed and direction selection by the pilot or co-pilot.

Figure 6:
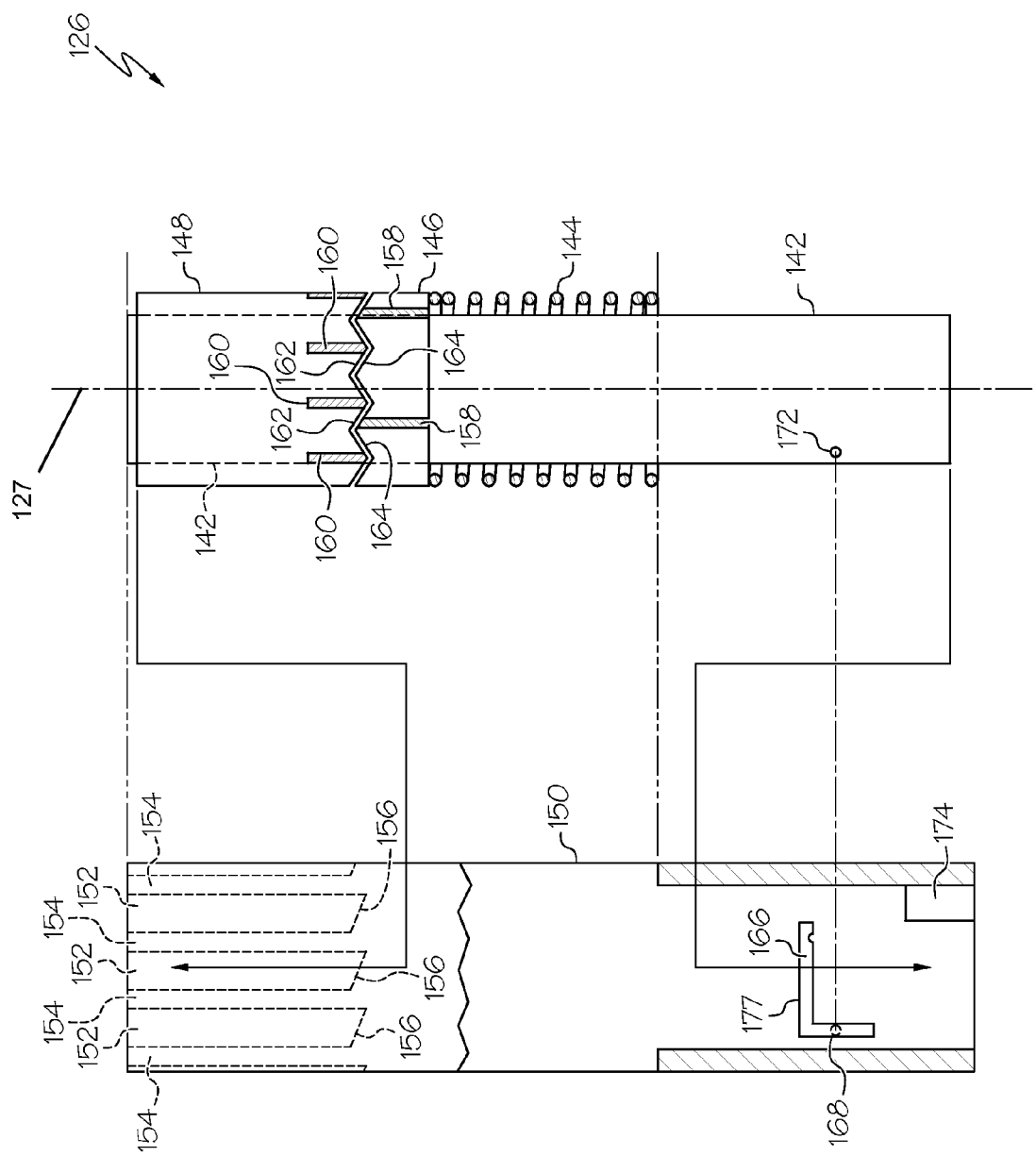
FIG. 6 is an exploded sectional view of a shaft assembly of the ETS control interface of FIG. 6 in stowed position according to an exemplary embodiment of the present invention.
Figure 7:
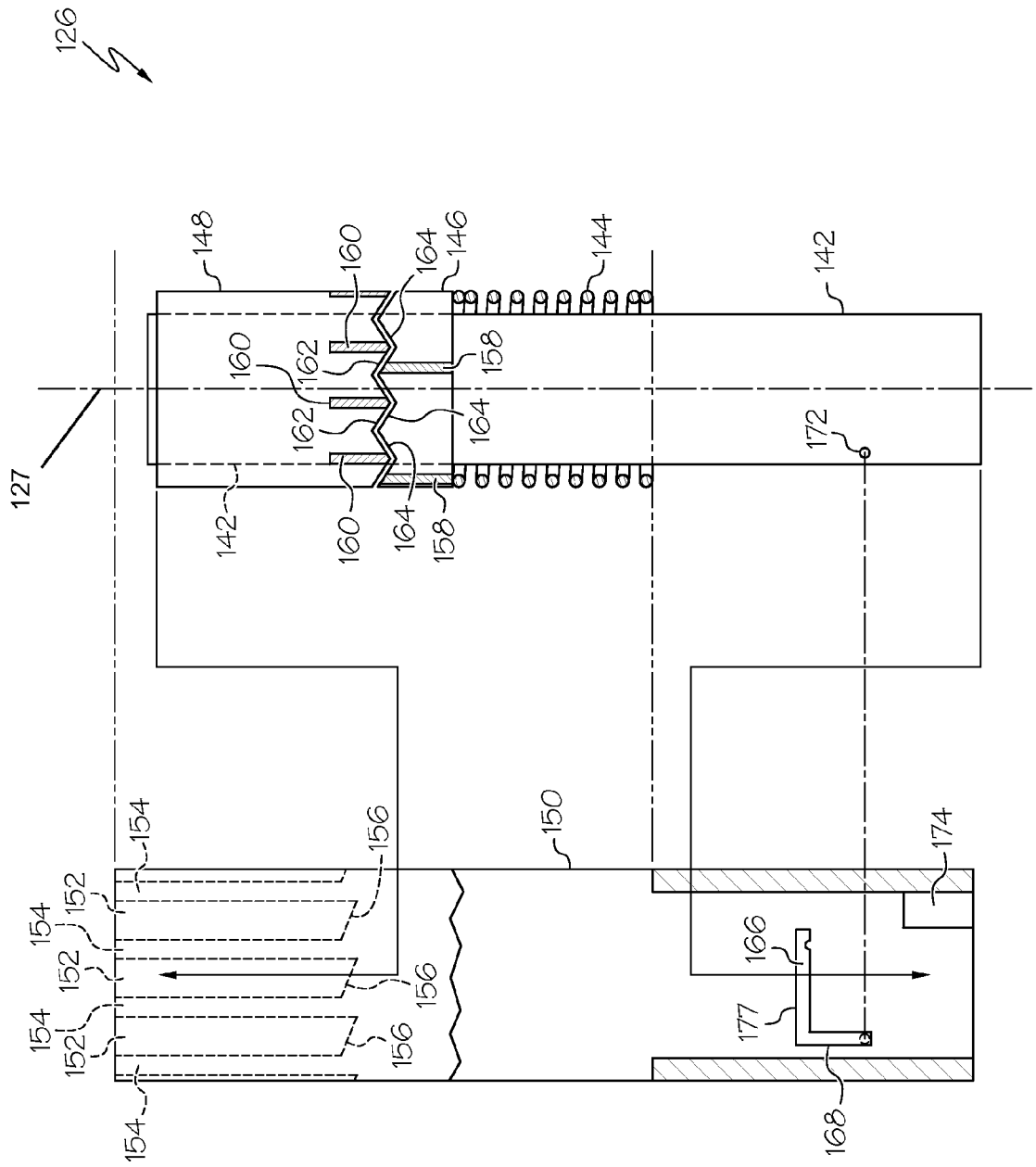
FIG. 7 is an exploded sectional view of the shaft assembly of the ETS control interface of FIG. 2 in a releasing position according to an exemplary embodiment of the present invention.
Figure 8:
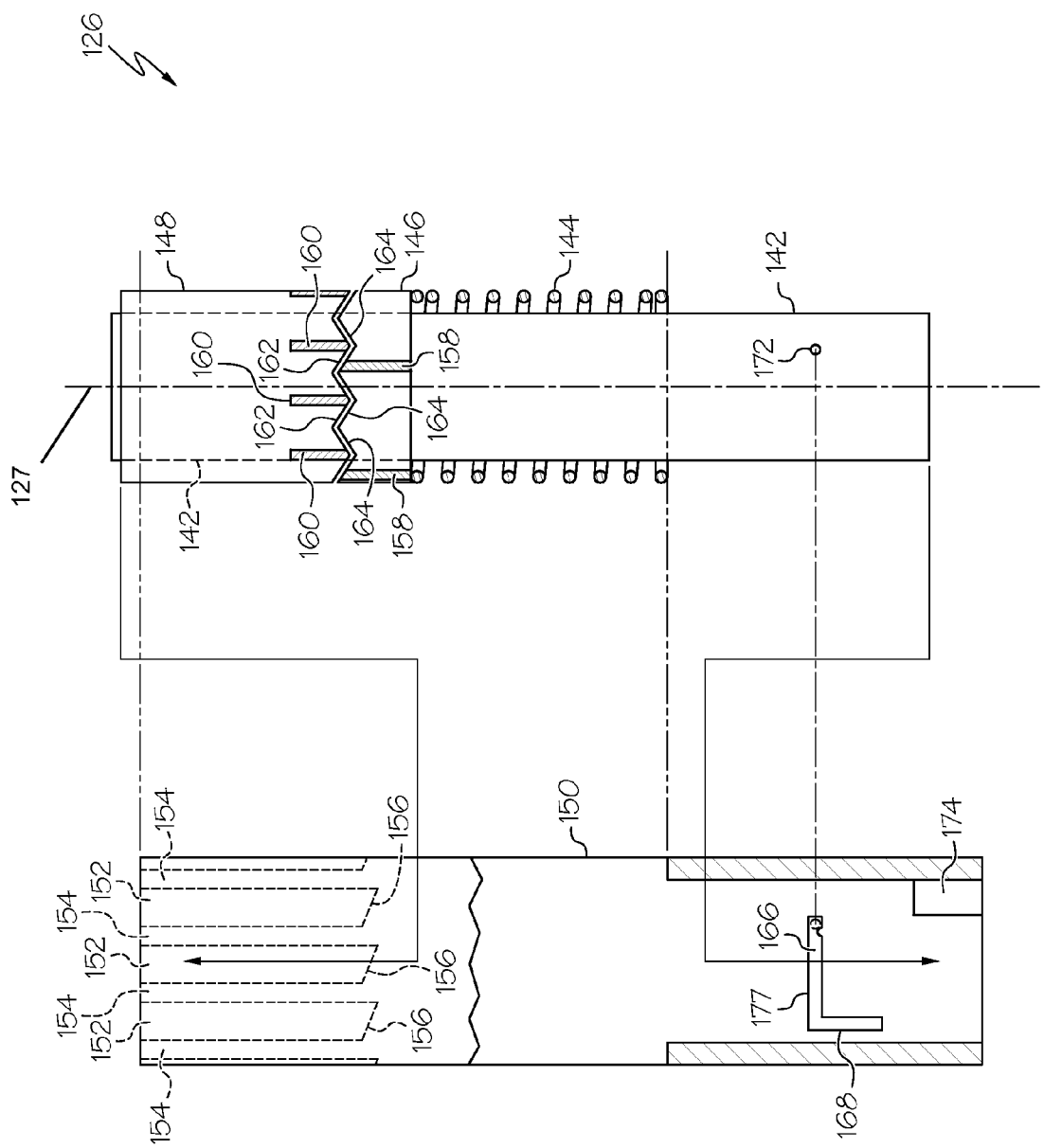
FIG. 8 is an exploded sectional view of the shaft assembly of the ETS control interface of FIG. 2 in an extended position according to an exemplary embodiment of the present invention.

Referring now to FIGS. 6, 7 and 8, an exemplary embodiment of the extendable shaft assembly 126 is illustrated in an exploded view format. The shaft assembly 126 may be a spring-biased assembly that includes an inner shaft 142, a compression spring 144, a locking ring 146, a releasing cylinder 148 and an outer sleeve 150. The outer sleeve 150 may be provided with internal ribs 152 spaced circumferentially to produce grooves 154 between the ribs 152. The ribs 152 are provided with cam ends 156.

In a stowed position, illustrated in FIG. 6, the ribs 152 may engage with ribs 158 of the locking ring 146. The compression spring 144 may be held in a compressed state by the locking ring 146 through engagement between the ribs 152 and 158. Consequently, the inner shaft 142 may remain in its lowered stowed position.

The inner shaft 142 may be released from its stowed position when the inner shaft 142 and the releasing cylinder 148 are moved downwardly as shown in FIG. 7. It may be noted that the releasing cylinder 148 may be provided with external ribs 160 which may be aligned with the grooves 154 of the outer cylinder 150. The releasing cylinder 148 may be provided with cams 162 which may engage with cams 164 of the locking ring 146. Downward force on the releasing cylinder 148 may result in interaction between the cams 162 and 164 to produce rotation of the locking ring 146 about the inner shaft 142. Such rotation may result in alignment between the ribs 158 of the locking ring 146 and the grooves 154 of the outer cylinder 150.

When the ribs 158 and the grooves 154 are aligned, the locking ring 146 may be free to rise within the outer sleeve 150, thereby allowing the compression spring 144 to expand. As a result, the inner shaft 142 may move to its active position as shown in FIG. 8.

The outer cylinder 150 may be provided with an L-shaped slot 166. The slot 166 may have a vertical leg 168 and a horizontal leg 170. A rotation constraining device such as a roll pin 172 may be attached to the inner shaft 142 and may engage with the L-shaped slot 166. In the stowed position of the inner shaft 142, the pin 172 may be near a bottom of the vertical leg 168. As the inner shaft 142 progresses from the stowed position to the active position, the pin 172 may move upwardly in the vertical leg 168 and then horizontally in the horizontal leg 170 as the inner shaft 142 and the attached actuator 122 are turned to an operating position. Interaction of the horizontal leg 170 and the pin 172 may limit rotation of the inner shaft to about 90°.

An activation switch 174 may be provided at a bottom end of the outer cylinder 150. In operation, the switch 174 may change its state when the inner shaft 142 moves to its active position as shown in FIG. 8. Change of state of the switch 174 may activate the control interface 104 so that that operational control of the ETS 108 may be performed by the pilot or co-pilot with the control interface 104. The switch 174 may function as a safety device to reduce risk of inadvertent operation of the ETS 108 prior to deliberate activation by the pilot or co-pilot.

In an exemplary embodiment, activation of the control interface 104 may be accomplished with a redundant operation of the switch 174 and a pushbutton 133 (See FIGS. 3 and 4 for example).

Figure 10:
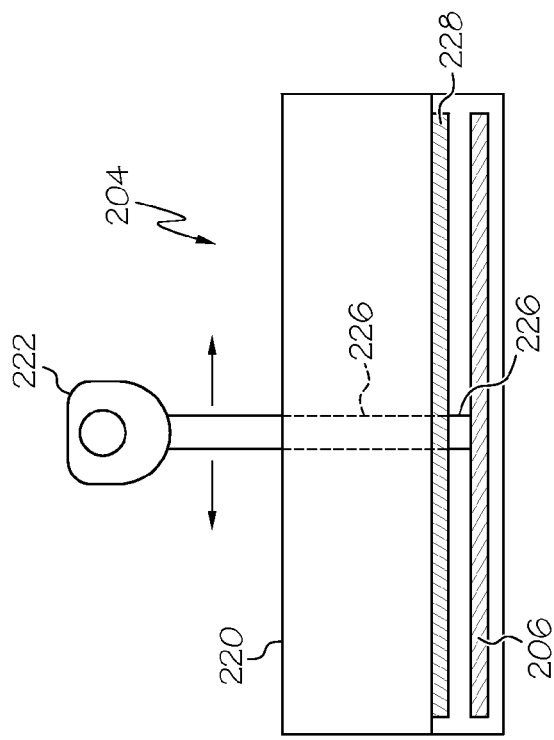
FIG. 10 is a side view of the ETS control interface of FIG. 9 with an actuator in an active position according to the second exemplary embodiment of the present invention.
Figure 9:
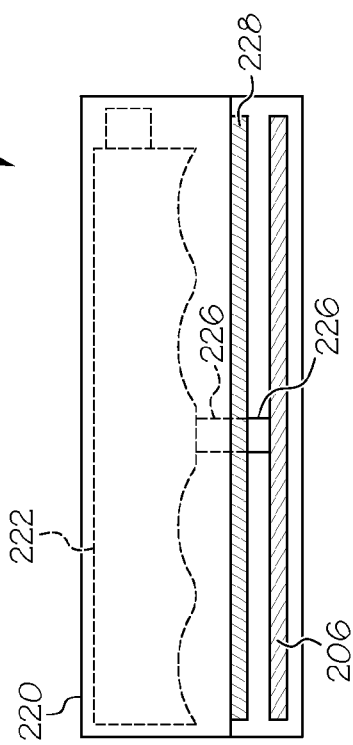
FIG. 9 is a side view of the ETS control interface with an actuator in a stowed position according to a second exemplary embodiment of the present invention.

Referring now to FIGS. 9 and 10, there is shown an exemplary embodiment of a control interface 204 which may employ a linear encoder 206 as an electronic control sensor. An actuator 222 may be moved from a stowed position as shown in FIG. 9 to an active position as shown in FIG. 10. Vertical and rotational movement of the actuator 22 may be performed in the same manner as that described above with respect to the control interface 104 of FIGS. 3 and 4.

Figure 11:
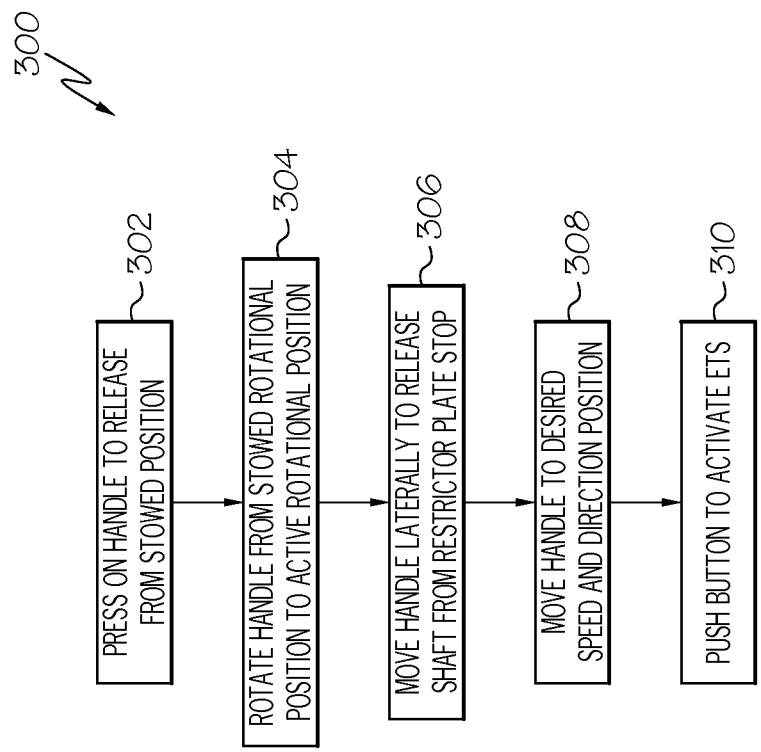
FIG. 11 is a flow chart of a method for controlling an ETS of an aircraft according to an exemplary embodiment of the present invention.

Referring now to FIG. 11, a flow chart illustrates an exemplary embodiment of a method 300 for controlling an ETS of an aircraft. In a step 302, a pilot or co-pilot of the aircraft may press on an actuator of a control interface to release the actuator from a stowed position (e.g., the actuator 122 may be pushed downwardly so that the extendable shaft assembly 126 is placed into its unlocking mode as illustrated in FIG. 7). In a step 304, the actuator may be rotated from its stowed rotational position to its active rotational position (e.g., the actuator 122 may be rotated so that the inner shaft 142 of the shaft assembly 126 rotates about 90°). In a step 306, the actuator may be moved laterally to release an actuator shaft from a restrictor plate stop (e.g., the actuator 122 may be moved laterally so that the shaft assembly 126 is moved out of a neutral stop 130 of the restrictor plate 128). In a step 308, the actuator may be moved to a desired speed and direction location (e.g., the actuator 122 may be moved, in a direction orthogonal to the lateral movement to a different stop of the restrictor plate 128). In a step 310, the ETS may be engaged (e.g., the pushbutton 133 on the actuator 122 may be pressed so that the ETS 108 may begin propelling the aircraft 100 consistently with the speed and direction selected in step 308).

It should be understood, of course, that the foregoing relates to exemplary embodiments of the invention and that modifications may be made without departing from the spirit and scope of the invention as set forth in the following claims.

I claim:

1. A control interface for an aircraft electric taxi system (ETS) comprising: an actuator;
   an electronic control sensor that provides speed and direction signals to the ETS; and
   an extendable shaft interposed between the actuator and the electronic control sensor;
   wherein the actuator is configured to rotate around an axis of the shaft between a first rotational position in which the actuator is non-operational and a second rotational position in which the actuator is operational;
   wherein the actuator has a longitudinal actuator axis;
   wherein the actuator axis is oriented in the first rotational direction, is in a first vertical position and is stowed within a housing when the actuator is non-operational; and
   wherein the actuator axis is oriented in the second rotational direction, orthogonal to the first rotational direction, is in a second vertical position, and is out of the housing when the actuator is operational.

2. The control interface of claim 1 wherein the actuator axis is oriented orthogonally to a longitudinal axis of an aircraft when the actuator is in the second position.

3. The control interface of claim 2 wherein the interface is configured so that control signals to the ETS result from movement of the actuator in a direction parallel to the longitudinal axis of the aircraft.

4. The control interface of claim 3 wherein movement of the actuator in a direction parallel to the longitudinal axis of the aircraft requires a preliminary movement of the actuator in a direction orthogonal to the longitudinal axis of the aircraft.

5. The control interface of claim 1 wherein the electronic control sensor is a rotary encoder.

6. The control interface of claim 1 wherein the electronic control sensor is a linear position encoder.

7. A control interface assembly for use in an aircraft comprising:
   a shaft assembly extendable between a first length and a second length longer than the first length;
   an actuator attached to an end of the shaft assembly;
   a locking device for maintaining the shaft assembly at its first length; and
   a releasing device configured to disengage the locking device upon compression of the shaft assembly from the first length to a third length shorter than the first length so that the shaft assembly is free to expand to the second length.

8. The assembly of claim 7
   wherein the actuator has a longitudinal actuator axis;
   wherein an inner shaft of the shaft assembly is rotatable around a shaft axis between a first rotational position and a second rotational position;
   wherein the inner shaft is provided with a rotation constraining device configured to constrain the inner shaft in its first rotational position when the shaft assembly is at its first length; and
   wherein the first rotational position is about 90° from the second rotational position of the shaft so that corresponding rotational positions of the actuator axis are about 90° from one another.

9. The assembly of claim 7:
   wherein the shaft assembly includes an outer sleeve surrounding an inner shaft, the sleeve having circumferentially alternating longitudinal ribs and grooves formed on its inner surface; and
   wherein the locking device includes a locking ring interposed between the outer sleeve and the inner shaft, the locking ring having external ribs formed thereon and oriented to engage with the ribs of the outer sleeve when in a constraining mode and to engage with the grooves of the outer sleeve when in a disengaged mode.

10. The assembly of claim 9:
wherein the disengagement device comprises a releasing cylinder surrounding the inner shaft;
wherein the releasing cylinder is provided with cams that engage cams of the locking ring; and
wherein the cams of the releasing cylinder and the locking ring are configured to interact with one another to rotate the locking ring to align the ribs of the locking ring with the grooves of the outer sleeve upon movement of the shaft assembly from its first length to its third length.

11. The assembly of claim 10 wherein the releasing cylinder is provided with external ribs spaced circumferentially around the releasing cylinder to align with the grooves of the outer sleeve.

12. The assembly of claim 7:
wherein the rotation constraining device comprises a pin projecting outwardly from the inner shaft
wherein the pin is engaged with an L-shaped slot formed in outer sleeve.

13. The assembly of claim 12:
wherein the L-shaped slot has a first leg oriented horizontally to limit rotational displacement of the inner shaft; and
wherein the L-shaped slot has a second leg oriented vertically to limit vertical displacement of the inner shaft.

14. The assembly of claim 7 further comprising:
a restrictor plate,
wherein the shaft assembly is laterally spring-biased to bear against the restrictor plate; and
wherein the restrictor plate is provided with a plurality of shaft stops.

15. The assembly of claim 14 wherein the restrictor plate is provided with a neutral stop.

16. A method for controlling an aircraft electric taxi system (ETS) comprising the steps of:
releasing an actuator of a control interface by applying pilot-controlled pressure to the actuator;
rotating the actuator to an active rotational position orthogonal to a stowed rotational position; and
moving the actuator to produce a speed and direction signal to the ETS;
wherein the releasing, the rotating and the moving steps are performed in a flight deck of an aircraft.

17. The method of claim 16 further comprising the step of pressing a pushbutton to engage the ETS so that ETS begins propelling an aircraft consistently with the speed and direction signal.

18. The method of claim 17 wherein moving the actuator between a forward direction command position and a reverse direction command position includes a step of releasing the spring-biased shaft from a neutral stop of the restrictor plate.

19. The method of claim 16:
wherein the step of moving the actuator to produce a speed and direction signal to the ETS includes a step of moving the actuator laterally to release a spring-biased shaft from a stop of a restrictor plate of the control interface.

* * * * *